United States Patent
Wooton et al.

(10) Patent No.: US 10,454,796 B2
(45) Date of Patent: Oct. 22, 2019

(54) CLOUD BASED SYSTEM AND METHOD FOR MANAGING MESSAGES REGARDING CABLE TEST DEVICE OPERATION

(71) Applicant: Fluke Corporation, Everett, WA (US)

(72) Inventors: Clinton J. Wooton, Lake Stevens, WA (US); David E. Bezold, Mukilteo, WA (US); John Paul Hittel, Scottsdale, AZ (US)

(73) Assignee: Fluke Corporation, Everett, WA (US)

( * ) Notice: Subject to any disclaimer, the term of this patent is extended or adjusted under 35 U.S.C. 154(b) by 202 days.

(21) Appl. No.: 14/878,855

(22) Filed: Oct. 8, 2015

(65) Prior Publication Data
US 2017/0104645 A1    Apr. 13, 2017

(51) Int. Cl.
- *H04W 4/02* (2018.01)
- *H04L 12/26* (2006.01)
- *H04L 12/58* (2006.01)
- *H04L 12/24* (2006.01)

(52) U.S. Cl.
CPC ........ *H04L 43/065* (2013.01); *H04L 43/0811* (2013.01); *H04L 43/50* (2013.01); *H04L 51/04* (2013.01); *H04W 4/025* (2013.01); *H04L 41/0604* (2013.01); *H04L 43/10* (2013.01)

(58) Field of Classification Search
CPC ....................................................... H04L 63/10
See application file for complete search history.

(56) References Cited

U.S. PATENT DOCUMENTS

| | | | | |
|---|---|---|---|---|
| 6,112,239 A | * | 8/2000 | Kenner | H04L 67/1008 709/223 |
| 6,314,086 B1 | * | 11/2001 | Katz | H04J 3/0685 370/241 |
| 6,438,212 B1 | * | 8/2002 | Lysaght | H04M 3/308 379/21 |

(Continued)

FOREIGN PATENT DOCUMENTS

WO    2012/009332 A2    1/2012

OTHER PUBLICATIONS

International Search Report for International Application No. PCT/US2016/056100 dated Jan. 16, 2017, 14 pages.

*Primary Examiner* — Edan Orgad
*Assistant Examiner* — Emmanuel K Maglo
(74) *Attorney, Agent, or Firm* — Seed IP Law Group LLP

(57) ABSTRACT

A system and method for generating messages from a cloud-based server relating to cable test device usage. Provided is at least one test device configured to perform one or more cabling test procedures and a cloud-based server configured to couple to the at least one cable test device for transmission of data therewith. The cloud-based server includes a database configured to store test device activity data received from the one or more cable test devices. The cloud-based server includes a processor configured to define messages to be electronically delivered to one or more prescribed recipients contingent upon a defined event being satisfied by the received cable test device activity data and to analysis the cable test device activity data stored in the database to determine when a defined event has been satisfied. A message is electronically transmitted to the prescribed recipients when the defined event is determined satisfied.

20 Claims, 5 Drawing Sheets

(56) References Cited

U.S. PATENT DOCUMENTS

| | | | | |
|---|---|---|---|---|
| 8,418,000 | B1* | 4/2013 | Salame | G06F 11/079 714/26 |
| 9,705,780 | B2* | 7/2017 | Maness | H04L 43/50 |
| 2004/0236991 | A1* | 11/2004 | Brundridge | H04L 1/24 714/25 |
| 2004/0260798 | A1* | 12/2004 | Addington | H04H 20/78 709/223 |
| 2004/0261126 | A1* | 12/2004 | Addington | H04N 21/2543 725/135 |
| 2007/0210809 | A1* | 9/2007 | Zhou | H04M 3/305 324/697 |
| 2009/0112101 | A1* | 4/2009 | Furness, III | G01J 3/02 600/477 |
| 2010/0071020 | A1* | 3/2010 | Addington | H04H 20/78 725/132 |
| 2010/0149998 | A1* | 6/2010 | Schryer | H04L 43/045 370/248 |
| 2011/0090048 | A1* | 4/2011 | Li | G06F 21/32 340/5.82 |
| 2011/0246638 | A1* | 10/2011 | Smith | H04L 41/069 709/224 |
| 2012/0004910 | A1* | 1/2012 | Quidilig | H04W 4/18 704/235 |
| 2014/0292348 | A1* | 10/2014 | Kanne | G01R 31/021 324/537 |
| 2015/0081758 | A1* | 3/2015 | Lee | H04L 43/50 709/201 |
| 2015/0095717 | A1* | 4/2015 | Frenz | G06F 11/323 714/46 |

* cited by examiner

CLOUD BASED SYSTEM AND METHOD FOR MANAGING MESSAGES REGARDING CABLE TEST DEVICE OPERATION

FIELD OF THE INVENTION

The disclosed embodiments generally relates to network cabling test devices, and more particularly, to managing a messaging system regarding operation of cable test devices.

BACKGROUND OF THE INVENTION

Modern networking systems can be networked through an interconnection of cables to provide increased communication, memory capacity and operating flexibility. Building, managing, and re-configuring the cable connections of a networked computer system is a complex task that may involve cable wiring diagrams, labeled cables, and connector reference designators. The task becomes increasingly complex with an increasing number of cables, connections and possible configurations, to the point where it is extremely difficult to effectively manage the cables, connections and configurations of the networked system in the traditional manner.

Modern test equipment is currently beginning to be 'cloud connected' in that the test equipment transmits the results of its testing (including simply that a test was conducted) to a cloud-based service available through the internet. Of significance, it is noted the test is no longer restricted to just the person or equipment conducting the test. That is, in many instances, another party, such as a supervisor or project manager also wants to be notified that the test occurred, and possibly view the results of those tests as well as other attributes regarding the test and/or test project.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof as well as from the appended drawings.

To achieve these and other advantages and in accordance with the purpose of the illustrated embodiments, in one aspect, described is a system and method for generating messages from a cloud-based server relating to cable test device usage. Provided is at least one test device configured to perform one or more cabling test procedures and a cloud-based server configured to couple to the at least one cable test device for transmission of data therewith. The cloud-based server includes a database configured to store test device activity data received from the one or more cable test devices. The cloud-based server includes a processor configured to define messages to be electronically delivered to one or more prescribed recipients contingent upon a defined event being satisfied by the received cable test device activity data and to analysis the cable test device activity data stored in the database to determine when a defined event has been satisfied. A message is electronically transmitted to the prescribed recipients when the defined event is determined satisfied.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
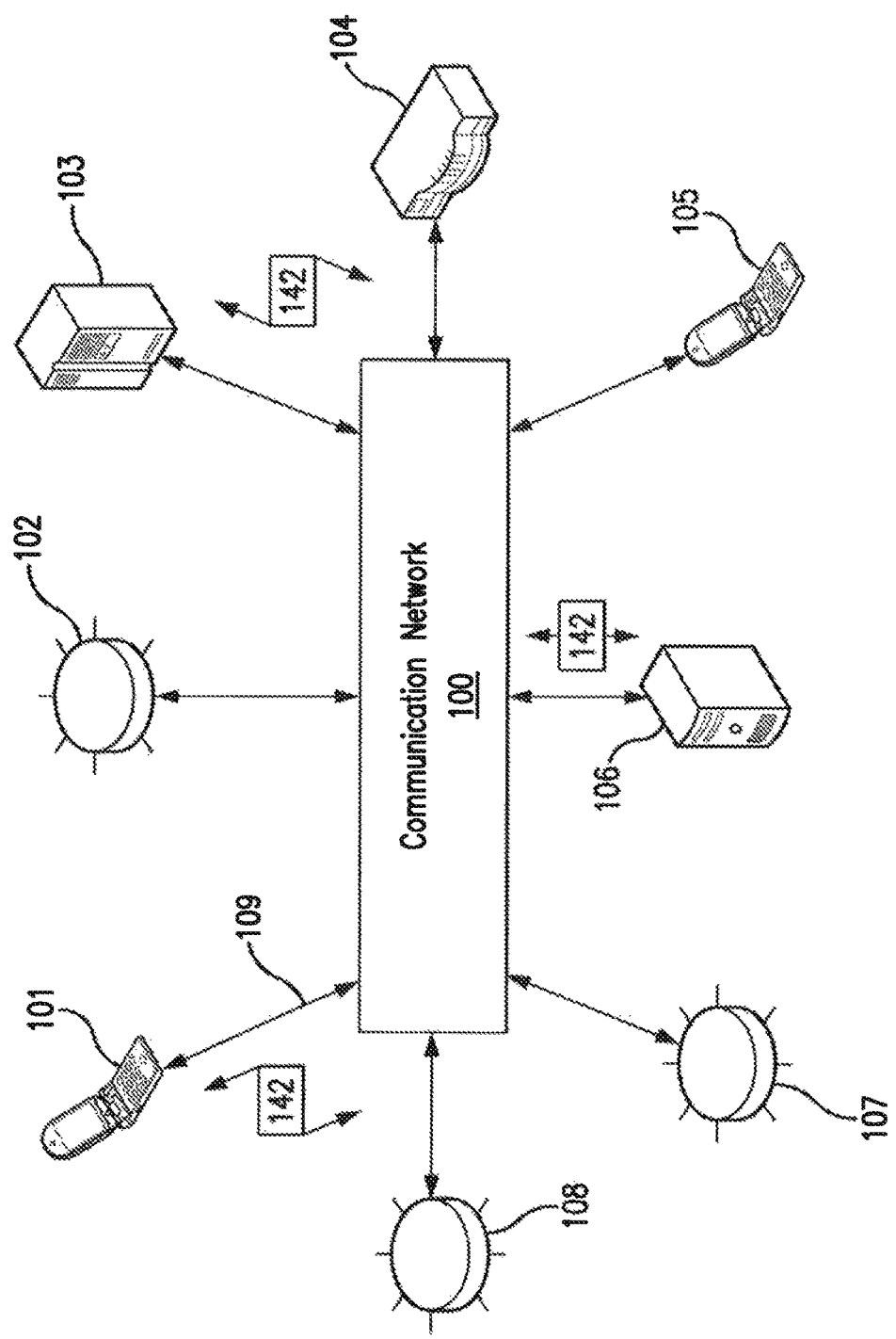
FIG. 1 depicts an exemplary communications network in which below illustrated embodiments may be implemented.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, cable testing device 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, non-magnetic optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing including SSD's or Solid State Drive. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RP, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing, apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
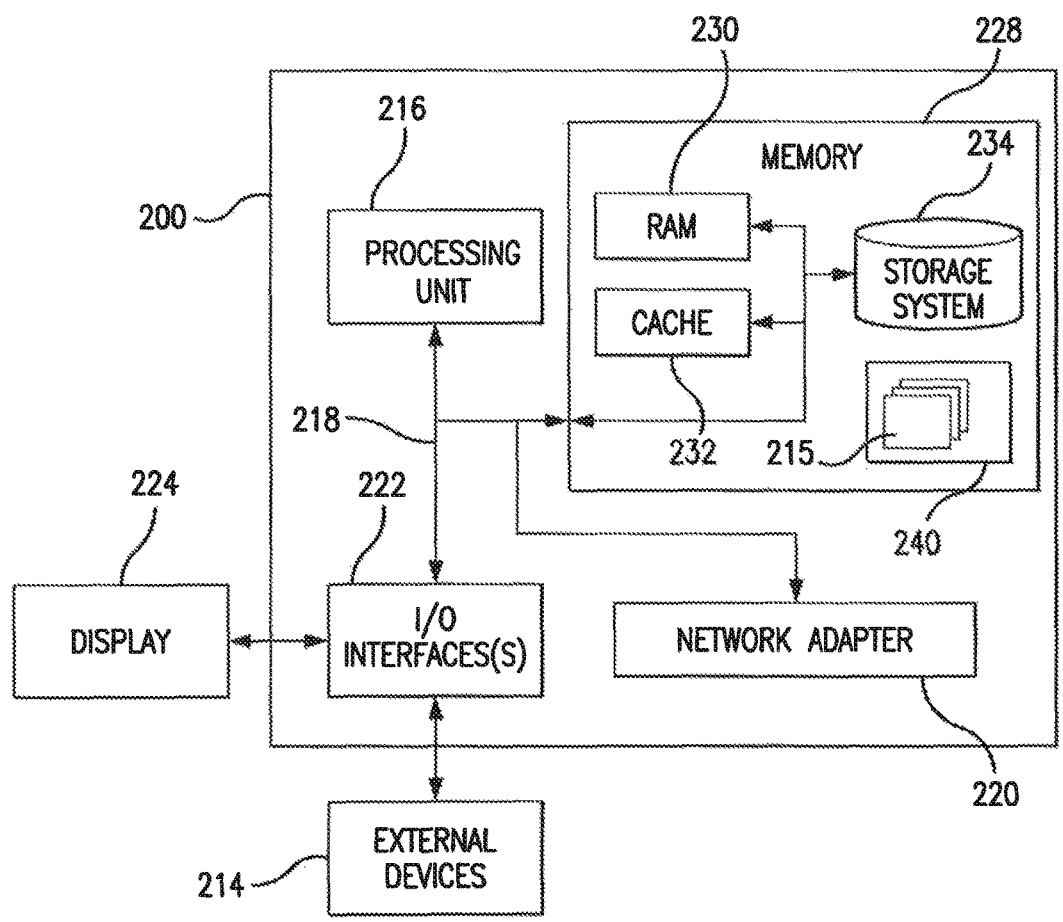
FIG. 2 depicts an example network device/node which may be used with the below illustrated embodiments.

FIG. 2 is a schematic block diagram of an example network computing device 200 (e.g., client computing device 103, server 106, smart phone device 105, cable testing device 107) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232, Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out e functions of embodiments of the invention.

Program/utility 240, having a set at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3A:
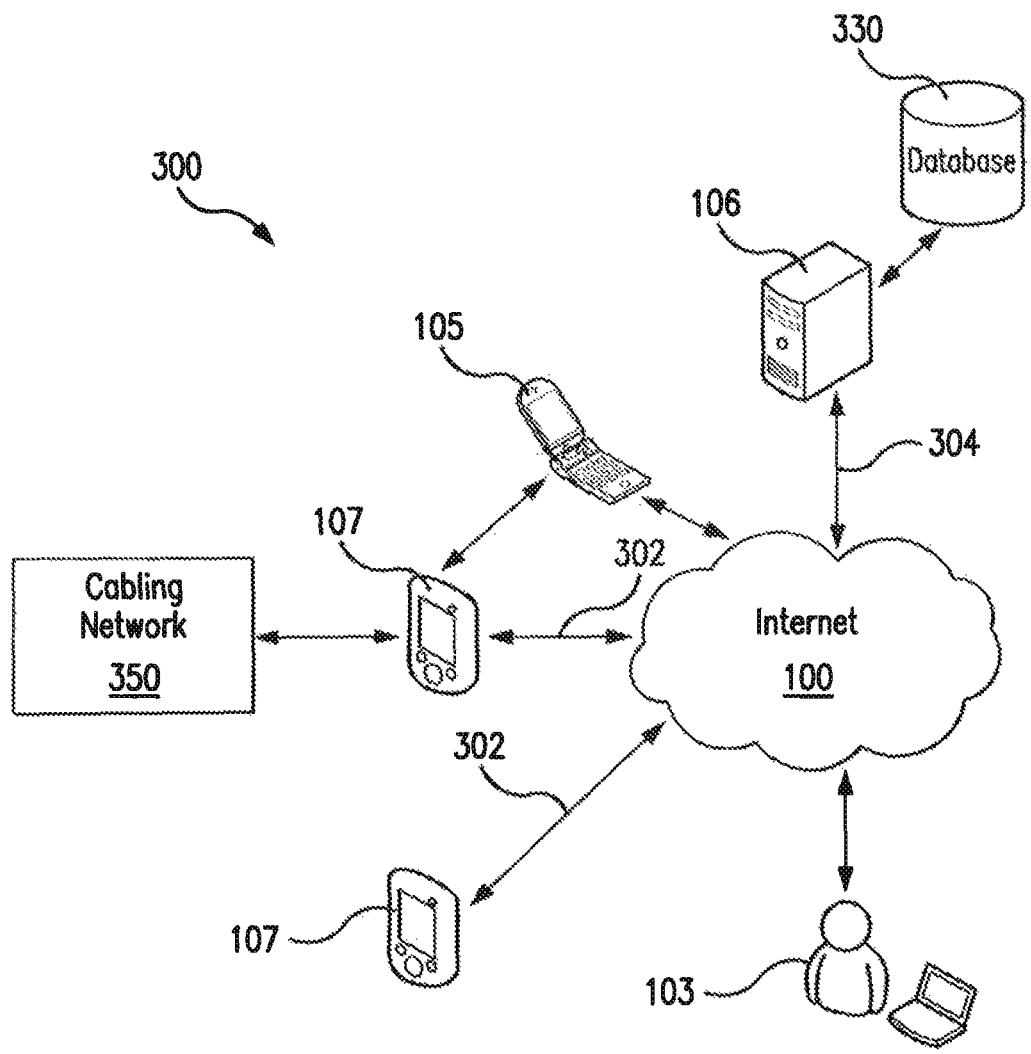
FIGS. 3A and 3B depicts a cabling testing system 300 in accordance with the below illustrated embodiments.
Figure 3B:
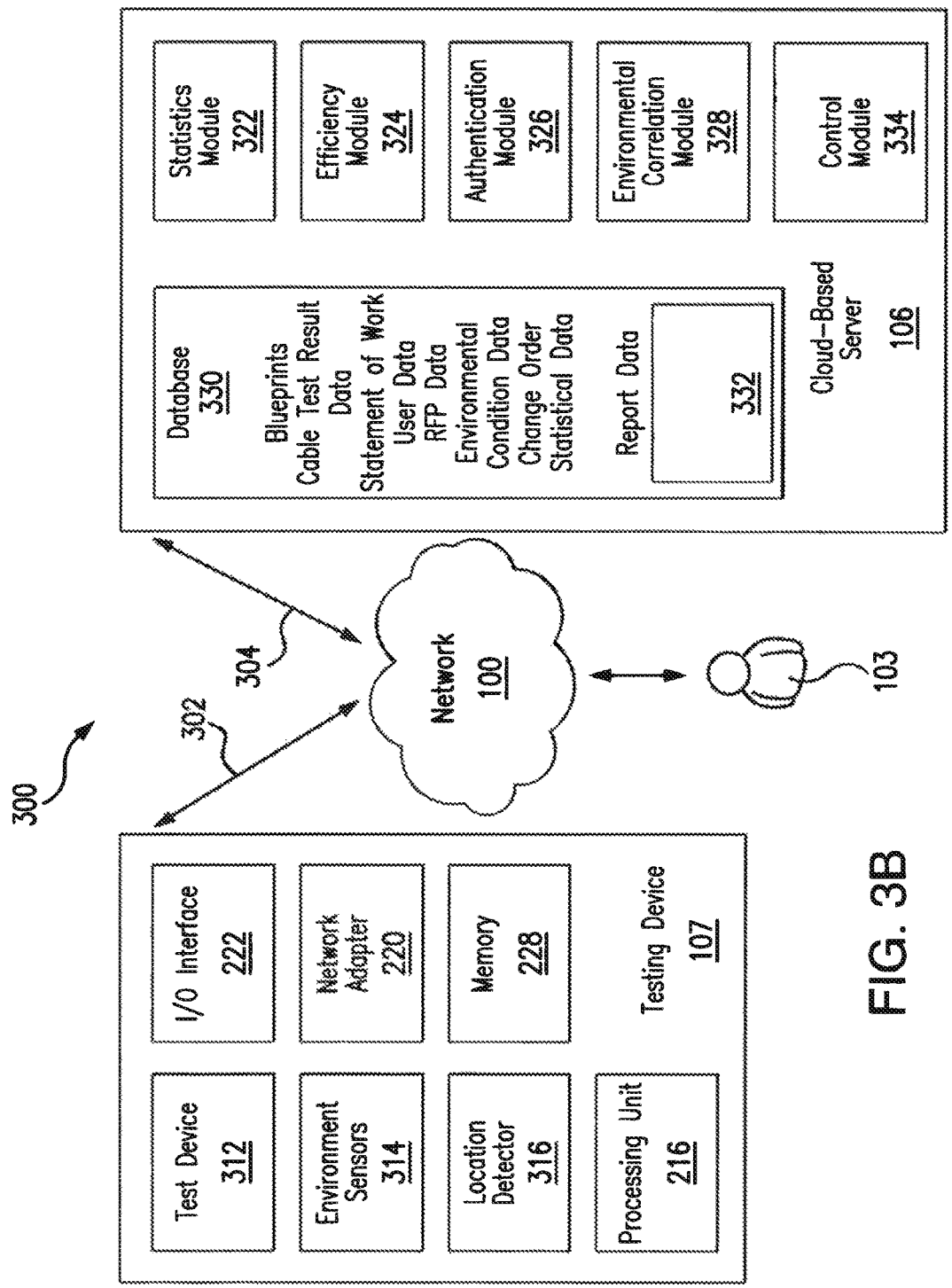

With the exemplary communication network 100 (FIG. 1) and computing device 200 (FIG. 2) being generally shown and discussed above, description of certain illustrated embodiments of the present invention will now be provided with specific regards to a system and method for managing a messages regarding operation of cabling testing devices 107. It is to be appreciated the messages regarding operation (or non-operation) of testing devices 107 includes, but is not limited to alert type messages (examples of which are provided further below). With reference now to FIGS. 3A and 3B, a cloud-based network testing system 300 includes a plurality of cabling testing devices 107 (as described below). It is to be appreciated a cloud-based server/host 106 (as also described below) receives test result data from different testing devices 107 regarding various functions including, but not limited to: generating statistics related to the testing devices 107 and authenticating test result data received from testing devices 107. Further, and as described below, the cloud-based server 106 is configured to enable messages to be defined regarding operation of the testing devices 107, preferably according to a set of user defined rules, wherein the user is not limited to a testing device 107 but may encompass any user 103 provided access to the cloud-based server 106. The cloud-based server 106 is further configured (as also described below) to send aforesaid defined messages to intended recipients when a defined event regarding the message has been satisfied (e.g., testing has commenced for a project).

It is to be appreciated that for ease of illustration purposes, only usage of a single testing device 107 is described, however, it is to be understood cabling testing system 300 may involve the simultaneous use of a plurality devices 107. An example testing device 107 is a portable tool than can include a computer system that functions as a node of a network which is similar to communication network 100 shown in FIG. 1. Similarly, the server 106 can be a web server that includes a computer system that functions as a node of network 100.

The testing device 107 preferably communicates with the network 100 using a first communication link 302, and the server 106 communicates with the network 100 using a second communication link 304. The first and second communication links 302, 304 can each include a single or multiple wired and/or wireless links. In embodiments, some of these links use near-field communication, such as radio frequency identification (RFID), cellular telecommunication schemes (e.g., 3G, LTE), Bluetooth, infrared communication, or the like. In embodiments, the network 100 includes the Internet. The testing device 107 can be selectively coupled (using its internal communication components) to the network 100 so that the first communication link 302 can be intermittent, e.g., disrupted and reestablished. The second communication link 304 can be stable and readily available during operation times for communicating with the testing device 107. In other embodiments, the testing devices 107 communicate indirectly with the cloud-based server 105 via a communication device 106, such as a mobile phone, tablet, or laptop computer.

The testing device 107 and the cloud-based server 106 can each be configured similarly to the network computing device 200 shown in FIG. 2, such as to include a processing unit 216, a network adapter 220, an I/O interface 222, and memory 228.

It is to be understood network testing system 300 may encompass a variety of different types of cabling testing devices 107. Examples include, and are not limited to the flowing Fluke Network® instruments: Optifiber® Pro OTDR; CertiFiber® Pro Optical Loss Test Set and the DSX-5000 CableAnalyzer™. It is to be further appreciated the illustrated embodiments of the present disclosure encompass tests for network cable including diagnostics, verification, qualification, and certification. With regards to certification testing, and as a non-limiting example, the Versiv™ product from Fluke Network® may be used to facilitate such cable certification.

The testing device 107 may allow simultaneous operation of multiple applications. It is to be appreciated the testing device 107 may include an operating system (e.g., Linux) embedded hardware/server. Using a combination of the features of an operating system, the testing device 107 may be configured to receive firmware updates and test configurations by a network connection preferably via the Internet 100. The test configurations are preferably software packets sent from a cloud-based server device 106 (via network 100) to a testing device 107 to enable/configure the testing device 107 to perform predetermined testing routines upon a network 350 to be tested by a testing device 107.

In operation, the testing device 107 may conduct a cabling test, e.g., for diagnostics, verification, certification, or qualification of copper or fiber cable. Cables to be tested can include low-voltage CAT3, CAT5, CAT5E, CAT6, UTP, STP, SSTP and/or FTP data cables, standard voltage electrical wiring, and/or connectors (e.g., connecting devices) that connect two or more cables) that form a portion of a network within a premise (e.g., a home, office, school, and the like). In an example test procedure, one or more ports of the testing device's I/O interface 222 are coupled to at least one of a patch panel port of a patch panel in a data closet via patch cables for exchanging test signals and responses to test signals. Test procedures can include, for example, a cable integrity test or a network connectivity test associated with one or more networked devices (e.g., routers, switches, end-devices, etc.).

As shown in FIG. 3B, the testing device 107 is typically a portable device that can further include a test device 312, environmental sensors 314, and/or a location detector 316. The test device 312 includes one or more sensors to measure electrical characteristics of a signal or power source. The environmental sensors 314 include one or more sensors to measure a characteristic of a physical entity, such as temperature, humidity, an exerted force, etc. Environmental sensors 314 can further detect electromagnetic interference (e.g., radio frequency interference), such as to determine proximity to devices that emit electromagnetic energy. The test device 312 and environmental sensors 314 can include an analog-to-digital (A/D) converter to convert the output signals into digital data. The output from the test device 312 and environmental sensors 314 can be time-stamped.

The location detector 316 senses a location of the testing device 107. The location detector 316 can include a Global Positioning System (GPS) sensor. In embodiments, the location detector 316 can include sensors that detect a characteristic, such as an optical code or RFID code, associated with a fixed device having a known location.

Additionally, in embodiments, the location detector 316 can include a device that is external from the testing device 107, and/or included in the cloud-based server 106. In an embodiment, the location detector 316 can be associated with a fixed device having a known location. The location detector 316 associated with the fixed device can sense the presence of the testing device 107, e.g., using optical sensing, RFID, Bluetooth, etc. In another embodiment, the location detector 316 included in the testing device 107 can detect the fixed device and use the location of the fixed device. In either of these scenarios, the location of fixed device can be used to determine the location of the testing device 107. Further, in embodiments, the location detector 316 can include logic to infer location of the testing device 107 from network signals such as IP address, RFD, WWI, and Bluetooth MAC addresses, and/or a GSM/CDMA cell ID associated with the testing device 107. The location detector 316 outputs time-stamped location data indicative of a location of the testing device 107. The location data can include geolocation data and/or a position of the testing device 107 inside a building, such as relative to a floor map.

The test device 312, environment sensors 314, and location detector 316 can include hardware and software modules (e.g., program modules 215 stored by memory 228 of the server 106.

The testing device's I/O interface 222 can include one or more cable ports an Ethernet port, data cable jacks such as RJ 45 jacks, wire clamps, optical ports, and the like), that interface with a cable, such as a patch cord. Test signals and responses can be transmitted and received via the cable ports.

The testing device's processing unit 216 is configured to select test signals to transmit via the cable ports (e.g., pings) pursuant to test configuration instructions typically stored in the device memory 228. The processing unit 216 can further process signals received in response to transmission of the test signals via the ports. The processing unit 216 can process output received from the test device 312 and the environmental sensors 314, perform one or more circuit and/or network connectivity diagnostic tests, and generates corresponding test result data pursuant to specific test configuration instructions. The test result data can include metadata and data that provides information about the test procedure and the test results.

For example, the test result data can indicate which type of entity was read or measured (e.g., voltage, current, time (e.g., time interval from ping transmit till ping receive), IP address, bit rate, packet capture rate, and the like) and a value that was read or measured. The value that was measured can be an electrical property (e.g., voltage or current) detected on a cable, time, IP addresses, bit rate, packet capture rate, or other measurements that indicate network device performance and/or network connectivity performance, and the like. Under the instructions from specific test configurations, the processing unit 216 can use utilities, such as Network Scans, Network Mapping, DNS resolution, DHCP, PING, TraceRoute, IPerf IPv4, and IPv6, etc., and the like, to generate the test result data.

Examples of information that the test result data and associated metadata can further provide include: information about a time that the testing procedure was begun and finished; identification of one or more operators operating the testing device 107; identification of the testing device 107; identification of a patch cord coupled to the testing device 107; identification of the cable under test; location data indicating a geographic location at the time of the testing procedure; environmental conditions at the time of the testing procedure; identification of the testing procedure being performed and/or a job that the testing procedure belongs to.

A job can be, for example, an installation job, in which a network or a portion of a network is installed at a particular location. In another example, a job can be a diagnostic job to identify and correct a problem. In another example, without limitation to the examples listed, a job can be a maintenance job to determine or measure performance of a network.

Identification of the testing device 107, cable under test, and/or patch cord used can be used to determine additional information, such as the make, model, manufacturer, owner, etc. of the testing device 107. The identification of the testing procedure and associated job can be used to determine additional information, such as for which customer the testing procedure or associated job is being performed as a service; which customer uses the cable under test for data communication, an associated monetary value (cost or billable value) for the testing procedure; and/or a geographic location, time, cable, patch cord, operator, duration, etc. that is assigned in connection with the testing procedure or job.

The testing device 107 can include a display device 224 or provide displayable test result data to a remote device, such as a mobile device (e.g., device 105). External devices 214 coupled to the testing device 107 can include a user input device (e.g., a keyboard, touchscreen (e.g., display device 224), and/or biometric sensor) via which an operator can enter user identification information (user ID). Entry of the user ID can be time stamped, and can be used to authorize use of the testing device 107 by the user. The input device can be used to send user input or requests to the cloud-based server 106. For example, if a user notices an anomaly in operation of a network cable, the user can send an alert to the cloud-based server 106 so that the cloud-based server can investigate if there is a correlation between the anomaly and environmental conditions indicated by output from the environment sensors 314.

During a test procedure pursuant to executing test configurations as received from the cloud-based server 106 (as further described below), the testing device 107 can generate one or more test signals, transmit the test signals for testing a cable, receive response test signals, process the response test signals, and transmit results to the cloud-based server 106 for analysis thereof. Processing the response test signals can include verifying whether or not a cable is receiving and transmitting data as intended (e.g., that the cable is connected properly, that the component wires of the cable have been terminated correctly without being crossed, all wires in the cable are transmitting data, etc.). When data is obtained from a test (pursuant to an executed received test configuration setup received from the cloud-based server 106), it may be stored in the testing device 107 and/or transmitted to the cloud-based server 106. Further, data may be aggregated for comparison with data from other testing devices 107 or cloud-based servers 106.

The cloud-based server 106 receives the test result data from the plurality of testing devices 107. It is to be appreciated the cloud-based server 106 may implement the LinkWare™ Live product from Fluke Network® to store and manage test result data received from remote testing devices 107 as well as to define and transmit messages regarding operation of testing devices 107, as described further below.

The cloud-based server 106 preferably includes a statistics module 322, an efficiency module 324, an authentication module 326, and an environmental correlation module 328, each of which can include software modules (e.g., program modules 215 stored by memory 228 of the server 304). The cloud-based server 106 includes or is coupled to a database 330 that stores information for a plurality of testing devices 107 that can couple to the cloud-based server 106 via network 100. Information stored by the database 330 can include, for example, cable test result data, operator data, environmental condition data, statistic data, and/or report data. The cloud-based server 106 further includes a message control module 334 configured and operational to enable a user 103, whom may remote from the user of a testing device 107, to access the cloud-based server 106 to define a message 332, preferably based upon prescribed rules (e.g., if test results for project X are not received by Jun. 10, 2015 from test device 107 having ID Y, then send a message to recipient Z indicating "Test Results for project X have not yet been received)" whereby the message recipient for example could be a manager for project X. (Other illustrative messaging examples are provided below with regards to FIG. 4). The user defined messages 332 are preferably stored in a database 330 associated with the cloud-based server 106.

Thus, a noted advantage is that message/alerts can be created by the cloud service 106, rather than a test device 107. Hence, messages/alerts are not only be transmitted to the user of a test device 107, but are also being transmitted to other interested parties 103 defined within the cloud service 106. Another noted advantage is the messaging service provided by the cloud-based server 106, preferably via message control module 334, is consistently running, and therefore can create alerts at any time. For instance, such alerts can encompass "We expected a test to be completed, but nothing has been reported" to "All expected tests are now completed" to "An unexpected test has been completed".

It is to be appreciated thus the illustrated embodiments regarding messaging relating to operation of the test devices 107 enables various stakeholders (Technician, project manager, business owner, etc.) to set various alerts about the tests conducted by test devices 107. These alerts are generated from the cloud service provided by cloud-server 106, via module 334, which service has exposure to an overall cable testing project or job via receipt of test results from test devices 107, as described above. Hence, the expansive exposure for an overall project enables the cloud-based server 106 to create alerts on conditions that ordinarily would not be visible to an individual test device 107. For example, if a project manager desired to be warned when the testing progress of a job falls behind schedule, and that job has a number of testing devices 107 being used, no one testing device 107 has the insight to notice that the overall job is behind schedule. In contrast, the cloud-based server 106 does have that visibility and can generate the alert, as discussed herein.

In other embodiments, it is noted that in addition to creating alerts, the cloud-based server 106 is configured and operational to enable a 'sleep' function whereby a recipient receiving test results is enabled to modify the message/alert (or create a new one) to repeatedly trigger after passage of a predetermined period of time. This re-triggering may occur only if the alerting condition is still true, or it may occur regardless of the original source of the message/alert.

Figure 4:
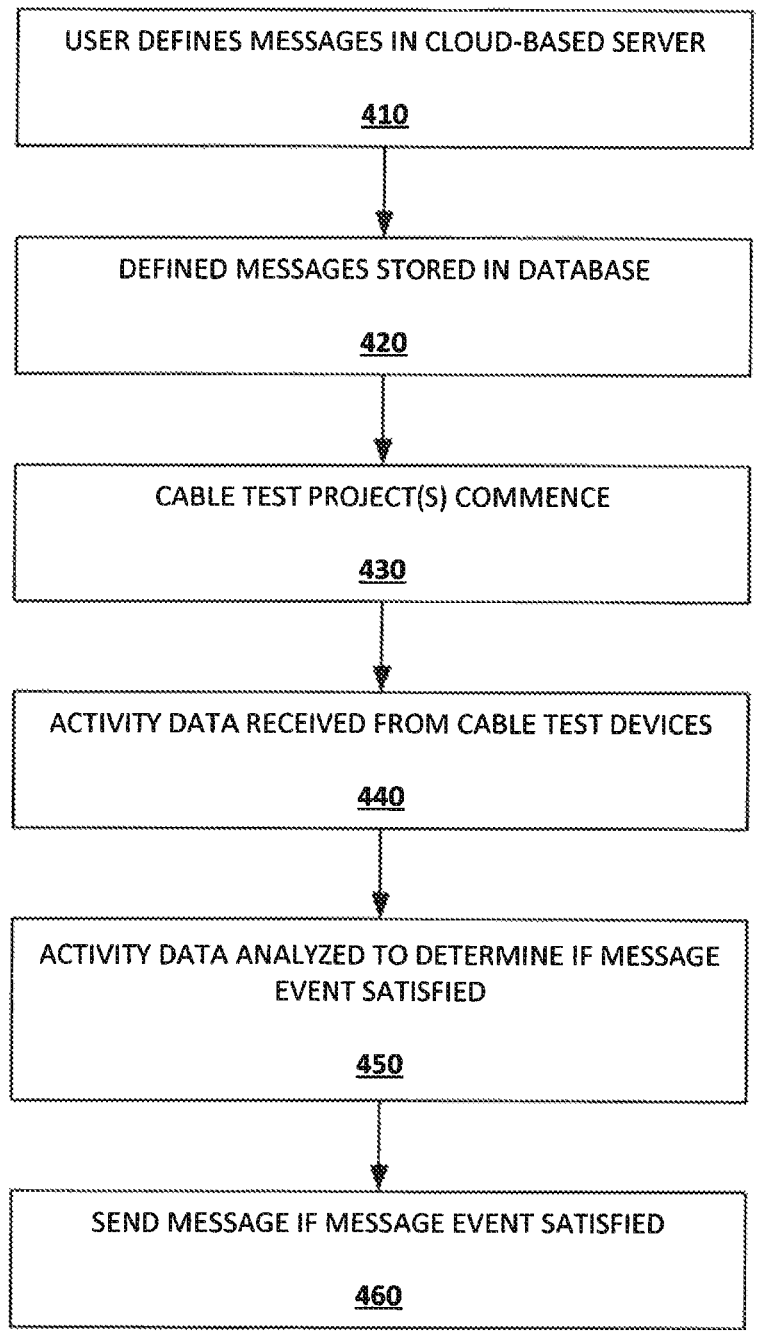
FIG. 4 illustrated a flowchart depicting an illustrated method of operation of the illustrated embodiments.

With reference now to FIG. 4, shown is a flow chart demonstrating implementation of the various exemplary embodiments. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

Starting at step 410, a remote user 103 via a user computing device (e.g., node smartphone device 105, a client computing device 103, or the testing device 302) may access a cloud-based service provided by the cloud-based server 106 to define one or more messages relating to the operation of one or more testing devices 107 relating to one or more projects. Each defined messages (e.g., "test results for Project X have not yet been received") is preferably rules based (e.g., if test results for project X are not received by Jun. 10, 2015 from test device 107 having ID Y, then send a message to recipient(s) Z indicating). Examples of such messages, include, but are not limited to: (i) an alert when a certain percentage of a job (e.g. 25% of expected cable tests) is complete; (ii) an alert when a job is complete; (iii) an alert when a job is behind schedule (e.g., the interested party would set a certain number of tests to be completed per time period. If the actual testing falls behind this rate, an alert would be generated); (iv) an alert when a job has not begun on time (e.g. no tests are completed by a certain date); (v) an alert if and when unexpected test data is received; (vi) an alert when test data is received, but the tests run are not those originally specified; (vii) an alert when multiple tests are received that appear to be substantially identical (e.g. the same cable is being retested for some reason—perhaps by accident); (viii) an alert when test results appear to be identical for different cables (e.g., someone is simply retesting the same cable over and over, but claiming that it is a bunch of different cables); (ix) an alert when a test is made for a particular site/project, but various types of location data indicate that the test was not done at the proper location; (x) an alert when internal characteristics of the testing device 107 appear to have problems (e.g. the calibration period has expired, or the RF noise environment is extremely high, or testing is occurring with a low battery); and (xii) an alert when a job is halted or paused (e.g., some results were received, but a significant period has elapsed without any new results.)

In an example embodiment, access to the cloud-based service for defining messages (as illustrated above) can be provided by web-browser software resident on the user computing device running applications (e.g., Java applets or other applications), which may include application programming interfaces ("API's") to more sophisticated applications running on remote servers. In an example embodiment, through web-browser software, a user can use a computer 103 to log on to cloud-based services (e.g., by the web-browser software resident on the computer 103 communicating with cloud-based server device 106) to access cloud-based applications for one or more testing devices 107. After logging-on to a cloud-based application on server 106, the user may create, edit, save and delete aforesaid cable test device messages in the cloud-based server device 106, and may establish (set up) or change/edit various options, such as user preferences and/or system settings, and/or may receive or download software (e.g., operating system or other software) or software updates, various data files or media files, user preferences and/or system settings, and other information previously stored on the cloud-based server device 106.

Next, step 420, the aforementioned user defined messages 332 (with accompanying rules and prescribed messaging recipients) are preferably stored in a database 330 associated with the cloud-based server 106. One or more cable testing projects associated with one or more user defined messages preferably commences (which may be before or after a message has been defined (step 420)), step 430.

Once a project has been commenced (or is scheduled to commence), test results activity data associated with the project may be received in the cloud-based server 106, via network 100, which are also preferably stored in a database 330 associated with the cloud-based server 106, step 440. Next, step 450, analysis is conducted upon the cable test device activity data stored in the database 330 to determine when a defined event has been satisfied regarding an aforesaid message 332 stored in the databased based upon it's prescribed rules (e.g., if test results for project X are not received by Jun. 10, 2015 from test device 107 having ID Y, then send a message to recipient(s) Z indicating). Next, step 460, if the defined event has been satisfied (e.g., test results for project X were not received by Jun. 10, 2015 from test device 107 having ID Y), then the defined message stored in the database 330 (e.g., "test results for Project X have not yet been received") is electronically transmitted to the designated recipient Z (e.g., a project manager for Project X). It is noted the electronic message may be sent from cloud-based server 106 using any suitable messaging protocol, including, but not limited to email, SMS, MMS, facsimile, provide indication via a website; provide a website link to the message, social media and the like.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for generating messages from a cloud-based server relating to cable test device usage, comprising:
    at least one cable test device configured to perform one or more cabling test procedures; and
    a cloud-based server configured to couple, via a network, to the at least one cable test device for transmission of data therewith, the cloud-based server including:
        a database configured to store cable test device activity data received from the at least one cable test device; and
        a processor configured to:
            receive, from a remote user prior to the at least one cable test device performing the one or more cabling test procedures, a remote-user-defined message having content that is defined by the remote user and is to be electronically delivered to one or more prescribed recipient computing devices contingent upon a defined event being satisfied by the received cable test device activity data;
            in response to receiving the cable test device activity data after the at least one cable test device performs the one or more cabling test procedures, analyze the received cable test device activity data to determine when the defined event has been satisfied; and
            electronically transmit the remote-user-defined message to the one or more prescribed recipient computing devices in response to determining that the defined event is satisfied by the received cable test device activity data.

2. The system as recited in claim 1, wherein each of the at least one cable test device is configured to perform at least one of a cabling certification, qualification, and verification of a cable.

3. The system as recited in claim 1, wherein the remote user that defines the remote-user-defined message to be electronically delivered contingent upon the defined event being satisfied by the received cable test device activity data is separate from a user of the cable test device, and wherein the remote user interacts with the cloud-based server to define the remote-user-defined message to be generated based upon data parameters in the received cable test device activity data regarding a task involving testing of a cable.

4. The system as recited in claim 1, wherein the electronically transmitted message is sent to a said prescribed recipient computing device of the one or more prescribed recipient computing devices that is separate from the at least one cable test device.

5. The system as recited in claim 1, wherein the electronically transmitted message is delivered to the one or more prescribed recipient computing devices via one of a text message, email or via a website page.

6. The system as recited in claim 1, wherein the remote-user-defined message relates to the one or more cabling test procedures being performed for a cable network test project.

7. The system as recited in claim 6, wherein the cable network test project requires usages of a plurality of cable test devices.

8. The system as recited in claim 6, wherein the defined event relates to a completion percentage of the cable network test project.

9. The system as recited in claim 6, wherein the defined event relates to the cable network test project not commencing on a certain date.

10. The system as recited in claim 6, wherein the defined event relates to receipt of unexpected test data activity data relating to the cable network test project.

11. The system as recited in claim 6, wherein the defined event relates to received test data indicating cable testing being performed not in compliance with testing procedures prescribed for the cable network test project to which the received test data relates.

12. The system as recited in claim 6, wherein the defined event relates to receipt of a plurality of test data packets relating to a same cable test procedure.

13. The system as recited in claim 6, wherein the defined event relates to receipt of a test data packet regarding a geographic location of a cable test procedure.

14. The system as recited in claim 6, wherein the defined event relates to determining a cable test device requires calibration.

15. A method for generating messages from a cloud-based server relating to cable test device usage, comprising the steps:
    receiving, at a cloud-based server and from a first user, one or more user-defined messages having content that is defined by the first user and are to be generated and electronically sent from the cloud-based server to one or more prescribed recipient computing devices contingent upon a defined event being satisfied by cable test device activity data received in the cloud-based server relating to one or more cable test devices, wherein the first user is separate from a second user of the one or more cable test devices and interacts with the cloud-based server to define the one or more user-defined messages to be generated based upon parameters in the received cable test device activity data regarding a task involving testing of a cable, and wherein the one or more user-defined messages are received prior to receiving the cable test device activity data;
    receiving the cable test device activity data from the one or more cable test devices;
    analyzing the received cable test device activity data to determine when the defined event has been satisfied by the received cable test device activity data; and
    in response to the defined event being determined to be satisfied:
        generating the one or more messages defined by the first user; and electronically transmitting the one or more user-defined messages to the one or more prescribed recipient computing devices.

16. The method as recited in claim 15, wherein each of the one or more cable test devices is configured to perform at least one of a cabling certification, qualification, and verification of the cable.

17. The method as recited in claim 15, wherein the one or more user-defined message relates to a cable network test project.

18. The method as recited in claim 17, wherein the cable network test project requires usage of a plurality of cable test devices.

19. The method as recited in claim 17, wherein the defined event relates a completion percentage of the cable network test project.

20. A computing device, comprising:
a memory that stores computer instructions;
a processor that executes the computer instructions to perform actions, the actions including:
receiving, from a user, a user-defined alert having content that is defined by the user and is to be electronically transmitted to a recipient computing device in response to a defined event being satisfied by cable test data resulting from performance of a cabling test procedure on a cable by a cable test device, wherein the user-defined alert is received prior to the cable test device performing the cabling test procedure;
receiving, from the cable test device, the cable test data in response to the cable test device performing the cabling test procedure;
analyzing the received cable test data to determine if the defined event has been satisfied by the received cable test data; and
in response to the defined event being satisfied by the received cable test data, generating and electronically transmitting the user-defined alert to the recipient computing device.

* * * * *